United States Patent [19]

McFarland

[11] Patent Number: 4,557,140
[45] Date of Patent: Dec. 10, 1985

[54] HORSEPOWER AND FUEL CONSUMPTION GAUGE

[76] Inventor: Douglas F. McFarland, Davis City, Iowa 50068

[21] Appl. No.: 554,614

[22] Filed: Nov. 23, 1983

[51] Int. Cl.$^4$ ........................................... G01M 15/00
[52] U.S. Cl. ..................................... 73/114; 73/119 A
[58] Field of Search ...................... 73/113, 114, 119 A, 73/112, 116; 116/285

[56] References Cited

U.S. PATENT DOCUMENTS

| | | | |
|---|---|---|---|
| 1,630,029 | 5/1927 | Rippingille | 116/285 X |
| 2,244,587 | 6/1941 | Williams | 116/285 X |
| 2,276,717 | 3/1942 | Codebecq | 73/113 |
| 2,685,198 | 8/1954 | Saul, Sr. | 73/113 |
| 2,692,980 | 10/1954 | Platt | 340/52 R |
| 3,181,353 | 5/1965 | Brahm et al. | 73/117.3 |
| 3,195,349 | 7/1965 | Hage | 73/117.3 |
| 3,608,368 | 9/1971 | Cuff | 73/117.3 |
| 4,280,358 | 7/1981 | Henderson | 73/115 |
| 4,444,047 | 4/1984 | Kern | 73/114 |

FOREIGN PATENT DOCUMENTS

| | | | |
|---|---|---|---|
| 1180798 | 6/1959 | France | 73/113 |
| 2379806 | 10/1978 | France | 73/113 |
| 99477 | 8/1979 | Japan | 73/901 |

*Primary Examiner*—Jerry W. Myracle
*Attorney, Agent, or Firm*—Zarley, McKee, Thomte, Voorhees & Sease

[57] ABSTRACT

A gauge for determining power of an internal combustion engine is connected to the governor of the engine so as to directly measure the performance of the engine. The governor, which is also in communication with the engine throttle system, regulates the speed of the engine. The gauge includes a housing, a facing mounted within the housing and calibrated in units of horsepower, and an indicator needle pivotally mounted within the housing and being responsive to movement of the governor arm so as to indicate on the calibrated facing the power developed by the engine or the fuel consumed by the engine.

17 Claims, 2 Drawing Figures

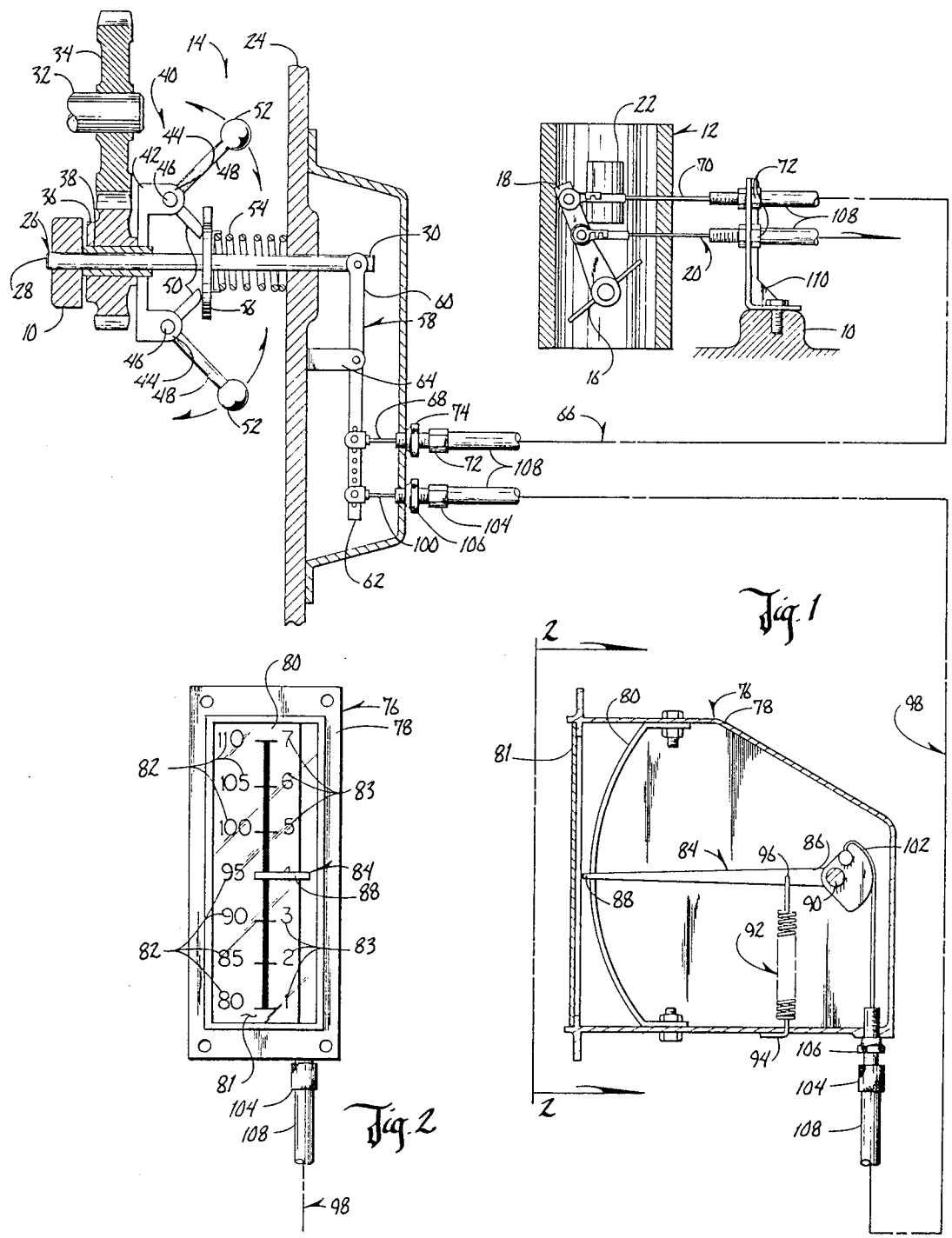

HORSEPOWER AND FUEL CONSUMPTION GAUGE

BACKGROUND OF THE INVENTION

Conventional power gauges and fuel efficiency gauges are usually connected to the air intake manifold coupled to the carburetor of an internal combustion engine. These standard gauges typically rely on the vacuum developed within the air intake manifold for determining the power developed in the engine and the related fuel consumption by the engine. This arrangement presents difficulties in a diesel engine since such an engine pulls no vacuum and there is no restriction on air intake.

Therefore a primary objective of the present invention is the provision of a gauge for the direct measurement of the horsepower developed in an engine in which the gauge does not rely upon the vacuum or pressure within the intake manifold of the engine.

A further objective of the present invention is the provision of a gauge connected to the governor of an internal combustion engine for the indication of horsepower developed within that engine.

A further objective of the present invention is the provision of a power gauge which accurately measures the instantaneous horsepower of an engine.

A further objective of the present invention is the provision of a gauge which measures fuel consumption of an internal combustion engine.

A further objective of the present invention is the provision of a power gauge which is economical to manufacture and durable in use.

SUMMARY OF THE INVENTION

The power gauge of the present invention for use on internal combustion engines, in particular diesel engines, is connected to the governor of the engine, which in turn is connected to the throttle system of the engine for controlling engine speed. The gauge includes a calibrated scale mounted within a housing and a needle pivotally mounted within the housing for indicating on the scale the horsepower developed by the engine. A linkage cable connects one end of the needle with the governor arm. As the governor arm moves in response to changes in engine speed, the needle pivots about the needle end connected to the linkage cable whereby the opposite end of the needle moves with respect to the calibrated scale so as to indicate engine horsepower. A spring connected at opposite ends to the needle and to the gauge housing opposes the motion of the linkage cable. Thus, as engine speed increases and the governor arm moves in response thereto, the linkage cable pulls on the one end of the needle to pivot the needle such that the opposite end of the needle registers a relative increase in horsepower on the scale. When the governor arm moves in response to a decrease in engine speed, the spring urges the needle to pivot such that the indicator end of the needle registers a relatively lower horsepower on the scale. The scale may also include calibrations for indication of fuel consumption.

BRIEF DESCRIPTION OF THE DRAWINGS

FIG. 1 is a sectional view showing the governor of the engine, the throttle system of the engine, the power gauge of the present invention, and the connections therebetween.

FIG. 2 is a front plan view of the calibrated scale of the gauge.

DETAILED DESCRIPTION OF THE DRAWINGS

The horsepower gauge of the present invention is for general use on internal combustion engines, in particular, diesel engines, having an engine frame generally designated by the numeral 10 to which a throttle system 12 and standard governor 14 are attached. Throttle system 12 includes a fuel inlet valve 16, an arm 18 conecting valve 16 to a throttle linkage 20 and a housing 22 that encloses the fuel jet mechanism of throttle system 12.

Governor 14 controls the speed of the engine and includes a housing 24, an elongated shaft 26 having opposite ends 28 and 30, and being slidably mounted along its longitudinal axis within governor housing 24 and engine frame 10. A second shaft 32 is in direct communication with the crankshaft or cam of the engine (not shown) for rotation therewith and has a gear 34 mounted thereon. Gear 34 is in meshing engagement with a second gear 36 mounted on a bushing 38 which is rotatably mounted upon shaft 26. Rigidly connected to bushing 38 is a fly weight 40 including a frame 42, and a pair of L-shaped arms 44 pivotally attached to frame 42 by pins 46. L-shaped arms 44 include a long portion 48 and a short lever portion 50. Attached to each long portion 48 of each arm 42 is a weight 52.

Governor 14 also has a spring 54 compressed between the governor housing 24 and a spring plate 56 fixed to shaft 26. Plate 56 engages lever portions 50 of arms 44.

A governor arm 58 has opposite ends 60 and 62 and is pivotally conncted to end 30 of shaft 26 at end 60. Governor arm 58 is also pivotally connected between ends 60 and 62 to a bracket 64 connected to governor housing 24. A governor-to-throttle cable 66 is connected at one end 68 to end 62 of arm 58 and at the other end 70 to arm 18 of throttle system 12. Cable 66 includes standard fittings 72 at each end and conventional adjustment nut 74 at one end for adjustment of the cable length.

The above-described governor 14 and throttle system 21 are not unique, but are known to the art and may take other commonly known constructions. The governor operates to control the speed of the engine. Shaft 32 of governor 14 turns in response to rotation of the crankshaft or cam shaft of the engine, thereby rotating gears 34 and 36, bushing 38, and fly weight 40. As engine speed increases, centrifugal force urges weights 52 outwardly away from the axis of shaft 28 such that lever portions 50 of arms 44 push against plate 56 so as to compress spring 54. As plate 56 is moved towards governor housing 24, shaft 26 also moves in that direction such that upper end 60 of governor arm 58 moves away from housing 24 while lower end 62 of arm 58 moves toward housing 24. Accordingly, governor-to-throttle cable 66 is activated to close valve 16 thereby decreasing the amount of fuel supplied to the engine so as to decrease the engine speed to the desired level.

When engine speed decreases below the desired level, the centrifugal force acting upon weights 52 is lessened such that spring 54 expands, thus forcing plate 56 against lever portions 50 of arms 44 such that weights 52 move towards the axis of shaft 26. As plate 56 moves away from housing 24 in response to the expansion of spring 54, shaft 26 and upper end 60 of governor arm 58 move towards governor housing 24 and lower end 62 of arm 58 moves away from housing 24. Accordingly, governor-to-throttle cable 66 moves throttle arm 18 so as to open valve 16 to permit more fuel to be supplied to the engine, thus increasing the engine speed to the desired level.

The heart of the present invention lies in the power gauge 76 which is connected to governor 14 to indicate housepower developed by the engine. Gauge 76 includes a housing 78 and a calibrated facing 80 mounted to the front of housing 78. A clear covering 81, such as glass or plastic, may cover facing 80 for protection thereof. Facing 80 includes marking 82 indicating horsepower units and may include additional markings 83 representing fuel consumption units in gallons per hour.

A needle 84 having opposite ends 86 and 88 is pivotally mounted at end 86 about a pin 90 attached to housing 78 of gauge 76. A spring 92 has one end 94 fixed to gauge housing 78 and an opposite end 96 connected to needle 84 between ends 86 and 88 thereof. Spring 92 urges indicator end 88 of needle 84 to lower horsepower markings on the facing. End 88 of needle 84 may be bent around facing 80 so as to enable easy reading of the gauge, as seen in FIG. 2. A governor-to-gauge cable 98 has one end 100 connected to lower end 62 of governor arm 58 and the opposite end 102 connected to end 86 of needle 84 so as to counteract the forces of spring 92 on needle 84. Cable 98 includes standard fittings 104 and adjustment nuts 106 at each end thereof. As described and seen in FIG. 1, needle 84 is directly connected to governor arm 58 by cable 98. Thus, as arm 58 moves in response to changes in engine speed, as previously described, cable 98 moves accordingly such that indicator end 88 of needle 84 moves with respect to the marking 82 and 83 on facing 80.

More particularly, as engine speed decreases, weights 52 of fly weight 40 are urged towards the axis of shaft 26 by governor spring 54 such that lower end 62 of arm 58 is moved away from housing 24 thereby increasing the length of cable 98 within gauge housing 78 such that gauge spring 92 pivots needle 84 downwardly about pin 90 so that indicator end 88 of needle 84 indicates a lower horsepower on gauge facing 80. Conversely, as engine speed increases, centrifugal force urges weights 52 away fom the axis of shaft 26 thereby compressing governor spring 54 and moving plate 56 and lower end 52 of arm 58 closer to housing 54, thereby decreasing the length of cable 98 within gauge housing 78 such that needle 84 pivots upwardly about pin 90 and indicator end 88 of needle 84 moves upward with respect to facing 80 so as to indicate increased horsepower of the engine.

Cables 66 and 98 may be encased with plastic 108 or the like for increased wear. Also, a bracket support 110 may be used for the convenient support of any of cables 66 and 98 or linkage 20, as shown in FIG. 1.

It is understood that gauge 76 may comprise a digital readout mechanism without departing from the scope of the invention. It is also recognized that any conventional means may be utilized for interconnecting governor 14 with throttle system 12 and gauge 76, such as a sliding or twisting rod whose motion is directly controlled by governor arm 58.

It can be seen that gauge 76 is directly connected to the crankshaft or cam of the engine via governor 14 so as to directly measure the power developed by the engine and/or the fuel consumption of the engine. Thus, at least all of the stated objectives are satisfied.

What is claimed is:

1. A gauge for determining industrial diesel engine horsepower performance at varying load conditions and at a constant full throttle speed said engine having a throttle system and an external governor having an arm means connected to said throttle system for maintaining a constant speed, comprising:
   a gauge housing,
   a calibrated facing mounted within said housing, and
   an indicator means pivotally mounted within said housing and operatively connected to said governor arm so as to be mechanically responsive to movement of the governor arm for continuously indicating on said calibrated facing the horsepower being developed by said engine.

2. The gauge of claim 1 wherein said indicator means comprises a needle having first and second opposite ends and a second connecting means attached at one end to said first end of said needle and at the opposite end to said governor arm.

3. The gauge of claim 2 wherein said neddle pivots about said first end in response to movement of said governor arm transmitted through said second connecting means whereby said second end of said needle moves with respect to said calibrated facing so as to indicate engine performance.

4. The gauge of claim 1 wherein said facing is calibrated in units of horsepower.

5. The combination of claim 1 wherein the readings on said indicator means are totally dependent on movement of said governor arm.

6. In combination with an internal combustion industrial diesel engine intended to be operated at a constant full throttle speed, said engine having an external governor in communication with a throttle system for maintaining a constant engine speed, said governor including a pivotable arm means which moves in response to changes in engine speed which is responsive to engine load, a gauge for determining horsepower of said engine under varying load conditions, said gauge comprising:
   a gauge housing,
   a scale calibrated in units of horsepower and mounted within said gauge housing, and
   a needle pivotally mounted within said housing for indicating on said scale the horsepower developed by said engine, said needle being operatively connected to said governor arm so as to be mechanically responsive to movement of said governor arm for continuously indicating on said scale the horsepower being developed by said engine.

7. The combination of claim 6 wherein said needle includes spaced apart first and second ends and is pivotally mounted at said first end about a shaft fixed to said housing, said second end being adjacent said scale for indicating horsepower.

8. The combination of claim 7 wherein said gauge further includes a spring attached at one end to said gauge housing and attached at the opposite end to said needle so as to urge said second end of said needle towards a lower horsepower indication on said scale.

9. The combination of claim 8 wherein said gauge further includes a connecting means attached at one end to said first end of said needle and attached at the other end to said governor arm.

10. The combination of claim 9 wherein an increase in engine speed moves said governor arm whereby said connecting means pulls on said needle to pivot said needle such that said second end of said needle registers a relative increase in horsepower on said scale.

11. The combination of claim 9 wherein a decrease in engine speeds moves said governor arm whereby said spring pulls on said needle to pivot said needle such that said second end of said needle registers a relative decrease in horsepower on said scale.

12. The combination of claim 6 wherein the readings on said gauge are totally dependent on movement of said governor arm.

13. In combination with an internal combustion industrial diesel engine intended to be operated at a constant full throttle speed, said engine having an external governor in operative communication with a throttle system for maintaining a constant engine speed, said governor including a pivotable arm means which moves in response to changes in engine speed which is reponsive to engine load, a gauge for indicating horsepower of said engine under varying load conditions comprising:
 a readout means for continuously indicating horsepower being developed by said engine, and
 connecting means mechanically connecting said readout means with said governor whereby said readout means indicates horsepower of said engine in response to movement of said governor arm for continuously indicating on said readout means the horsepower being developed by said engine.

14. The combination of claim 13 wherein the readings on said readout means are totally dependent on movement of said governor arm.

15. The combination of claim 13 wherein said readout means indicates horespower developed by said engine.

16. The combination of claim 13 wherein said readout means includes a digital display means for indicating engine performance.

17. The combination of claim 13 wherein said readout means includes a calibrated scale and a needle for indicating engine performance with respect to said scale.

* * * * *